US011230370B2

United States Patent
Goldring et al.

(10) Patent No.: US 11,230,370 B2
(45) Date of Patent: Jan. 25, 2022

(54) UPPER SIDE STAY WITH MONOLITHIC UNLOCK ACTUATOR

(71) Applicant: GOODRICH CORPORATION, Charlotte, NC (US)

(72) Inventors: Eric Goldring, Milton (CA); Rony Giovanni Ganis, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 307 days.

(21) Appl. No.: 16/255,483

(22) Filed: Jan. 23, 2019

(65) Prior Publication Data
US 2020/0231274 A1    Jul. 23, 2020

(51) Int. Cl.
| | | |
|---|---|---|
| *B64C 25/26* | (2006.01) | |
| *B64C 25/20* | (2006.01) | |
| *B64C 25/34* | (2006.01) | |
| *B64C 25/10* | (2006.01) | |
| *B64C 25/22* | (2006.01) | |

(52) U.S. Cl.
CPC .............. *B64C 25/26* (2013.01); *B64C 25/10* (2013.01); *B64C 25/20* (2013.01); *B64C 25/34* (2013.01); *B64C 25/22* (2013.01)

(58) Field of Classification Search
CPC ......... B64C 25/20; B64C 25/22; B64C 25/26; B64C 25/10; F16M 11/38
See application file for complete search history.

(56) References Cited

U.S. PATENT DOCUMENTS

| | | | | |
|---|---|---|---|---|
| 2,422,576 A | * | 6/1947 | Martin | B64C 25/26 244/102 SL |
| 2,422,577 A | * | 6/1947 | Martin | B64C 25/20 244/102 R |
| 2,444,319 A | * | 6/1948 | Winter | B64C 25/26 244/102 SL |
| 2,959,381 A | * | 11/1960 | Hartel | B64C 25/20 244/102 R |
| 3,514,057 A | * | 5/1970 | Biggs | B64C 25/20 244/102 R |
| 4,433,820 A | * | 2/1984 | Turiot | B64C 25/20 244/102 R |
| 5,269,481 A | * | 12/1993 | Derrien | B64C 25/18 244/102 A |

(Continued)

FOREIGN PATENT DOCUMENTS

| | | |
|---|---|---|
| EP | 2386487 | 11/2011 |
| EP | 3275782 | 1/2018 |
| EP | 3351474 | 7/2018 |

OTHER PUBLICATIONS

European Patent Office, European Search Report dated Jun. 2, 2020 in Application No. 19215836.8.

(Continued)

*Primary Examiner* — Joshua J Michener
*Assistant Examiner* — Arfan Y. Sinaki
(74) *Attorney, Agent, or Firm* — Snell & Wilmer L.L.P.

(57) ABSTRACT

An upper side brace for use in landing gear includes a main body having a mounting end configured to be proximal to an aircraft and a lower end configured to be proximal to a lower side brace. The upper side brace further includes an unlock actuator cylinder formed monolithic with the main body and configured to house a piston to form an unlock actuator.

17 Claims, 2 Drawing Sheets

(56) References Cited

U.S. PATENT DOCUMENTS

| | | | |
|---|---|---|---|
| 8,061,653 B2 | 11/2011 | Chow et al. | |
| 10,086,928 B2 | 10/2018 | Ditzler | |
| 2008/0191090 A1* | 8/2008 | Chow | B64C 25/26 244/102 R |
| 2011/0278394 A1* | 11/2011 | Ditzler | B64C 25/26 244/102 SL |
| 2015/0246724 A1* | 9/2015 | Empson | B64C 25/26 244/102 R |
| 2015/0314861 A1* | 11/2015 | Paddock | B64C 25/26 244/102 A |
| 2016/0347444 A1* | 12/2016 | Vatovec | F03G 1/10 |
| 2017/0203833 A1* | 7/2017 | Schmidt | B64C 25/26 |
| 2018/0029697 A1* | 2/2018 | Ditzler | B64C 25/20 |
| 2018/0029698 A1* | 2/2018 | Ditzler | B64C 25/26 |
| 2018/0186446 A1* | 7/2018 | Schmidt | B64D 29/08 |
| 2018/0201365 A1* | 7/2018 | Acks | B64C 25/26 |
| 2019/0241256 A1* | 8/2019 | Moine | B64C 25/26 |

OTHER PUBLICATIONS

European Patent Office, European Office Action dated Sep. 1, 2021 in Application No. 19215836.8.

* cited by examiner

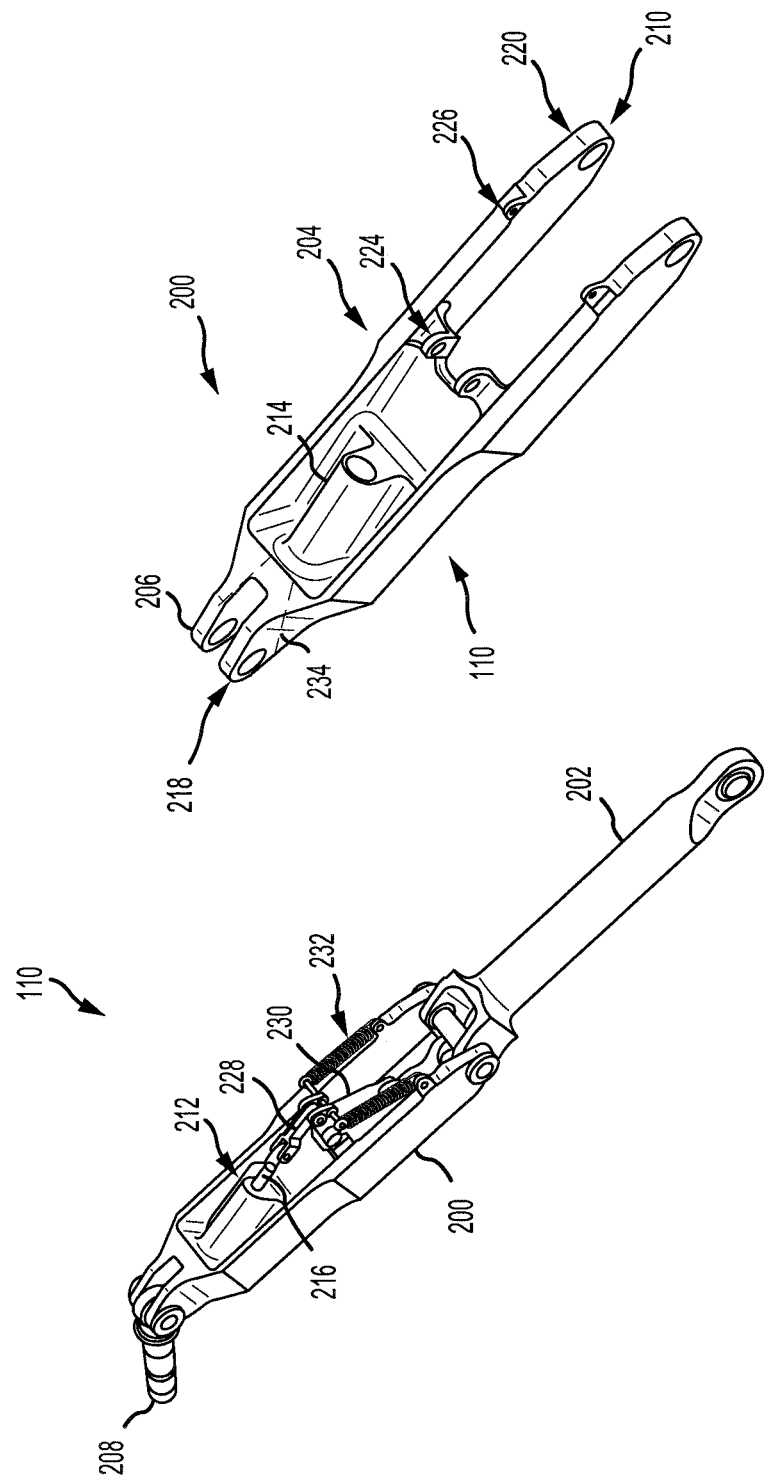

UPPER SIDE STAY WITH MONOLITHIC UNLOCK ACTUATOR

FIELD

The present disclosure relates to landing gear, and more particularly, to side brace assemblies for use in landing gear.

BACKGROUND

Many aircraft include landing gear assemblies. The landing gear assemblies include a main fitting that resists forward and aft translation or rotation of the landing gear during taxi, takeoff, and landing. Landing gear assemblies further include a side brace assembly designed to resist lateral rotation of the landing gear assembly. Many side brace assemblies may include an unlock actuator designed to actuate and unlock the landing gear in response to a request for the landing gear assembly to retract in order to allow stowing of the landing gear assembly.

SUMMARY

An upper side brace for use in landing gear includes a main body having a mounting end configured to be proximal to an aircraft and a lower end configured to be proximal to a lower side brace. The upper side brace further includes an unlock actuator cylinder formed monolithic with the main body and configured to house a piston to form an unlock actuator.

In any of the foregoing embodiments, the mounting end of the main body defines a mount hinge connector configured to pivotably couple to a mount.

In any of the foregoing embodiments, the lower end of the main body defines a lower hinge connector configured to pivotably couple to the lower side brace.

In any of the foregoing embodiments, the main body further defines a lock hinge connector located between the mounting end and the lower end and configured to be pivotably coupled to at least one lock link.

In any of the foregoing embodiments, the main body further defines a spring aperture configured to be coupled to a spring.

In any of the foregoing embodiments, the unlock actuator cylinder defines a tube configured to receive the piston of the unlock actuator.

Also disclosed is a side brace assembly for use in landing gear. The side brace assembly includes a lower side brace. The side brace assembly further includes an upper side brace having a main body with a mounting end configured to be proximal to an aircraft and a lower end configured to be coupled to the lower side brace, and an unlock actuator cylinder formed monolithic with the main body and configured to house a piston to form an unlock actuator.

Any of the foregoing embodiments may further include a mount, wherein the mounting end of the main body defines a mount hinge connector configured to be pivotably coupled to the mount.

In any of the foregoing embodiments, the lower end of the main body defines a lower hinge connector configured to be pivotably coupled to the lower side brace.

Any of the foregoing embodiments may further include the piston configured to be received by the unlock actuator cylinder.

Any of the foregoing embodiments may further include an actuator link, wherein the main body further defines a lock hinge connector located between the mounting end and the lower end and configured to be pivotably coupled to the actuator link such that the actuator link is located between the lock hinge connector and the piston.

Any of the foregoing embodiments may further include lock links extending from the lock hinge connector to the lower side brace.

Any of the foregoing embodiments may further include at least one spring, wherein the main body further comprises a spring aperture configured to be coupled to the at least one spring.

Also disclosed is a landing gear assembly. The landing gear assembly includes a main fitting configured to support the landing gear assembly. The landing gear assembly further includes a retraction actuator configured to retract the landing gear assembly. The landing gear assembly further includes a side brace assembly having a lower side brace, and an upper side brace having a main body with a mounting end configured to be proximal to an aircraft and a lower end configured to be coupled to the lower side brace, and an unlock actuator cylinder formed monolithic with the main body and configured to house a piston to form an unlock actuator.

Any of the foregoing embodiments further includes a mount, wherein the mounting end of the main body defines a mount hinge connector configured to be pivotably coupled to the mount.

In any of the foregoing embodiments, the lower end of the main body defines a lower hinge connector configured to be pivotably coupled to the lower side brace.

Any of the foregoing embodiments further includes the piston configured to be received by the unlock actuator cylinder.

Any of the foregoing embodiments further includes an actuator link, wherein the main body further defines a lock hinge connector located between the mounting end and the lower end and configured to be pivotably coupled to the actuator link such that the actuator link is located between the lock hinge connector and the piston.

Any of the foregoing embodiments further includes lock links extending from the lock hinge connector to the lower side brace.

Any of the foregoing embodiments further includes at least one spring, wherein the main body further comprises a spring aperture configured to be coupled to the at least one spring.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 2 illustrates a side brace assembly for use with the landing gear assembly of FIG. 1, in accordance with various embodiments; and FIG. 3 illustrates an upper side brace for use in the side brace assembly of FIG. 2, in accordance with various embodiments.

DETAILED DESCRIPTION

Figure 1:
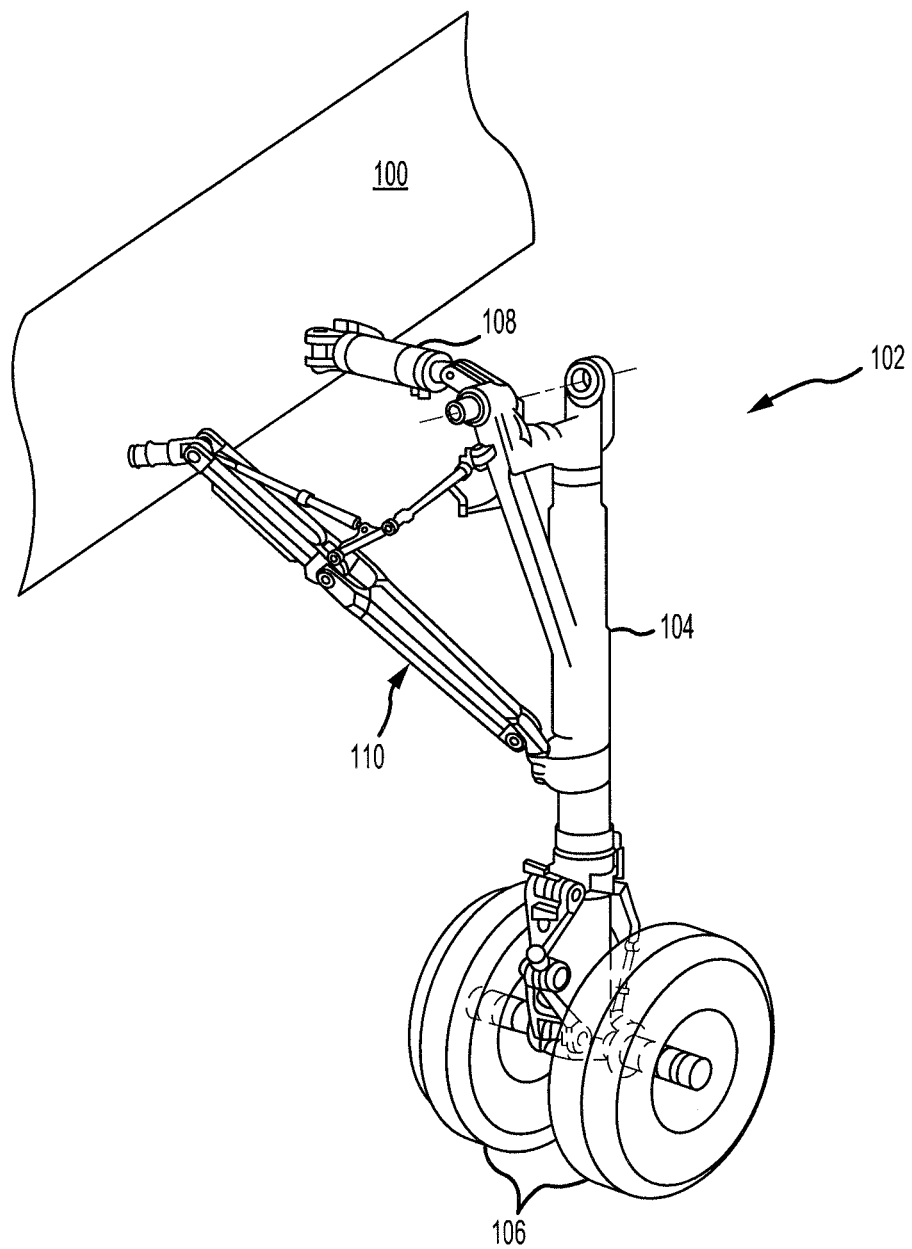
FIG. 1 illustrates a landing gear assembly of an aircraft, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

FIG. 1 illustrates a landing gear assembly 102 coupled to an aircraft 100. The landing gear assembly 102 includes a main fitting 104, wheels or wheel assemblies 106, and a retraction actuator 108. The retraction actuator 108 may retract the landing gear assembly 102 into a portion of the aircraft 100. Prior to retraction, the main fitting 104 may support the aircraft 100 on the wheels 106. In particular, the main fitting 104 may resist forward and aft translation or rotation of the landing gear assembly 102 during taxi, takeoff, and landing of the aircraft 100.

The landing gear assembly 102 may further include a side brace assembly 110. The side brace assembly 110 may lock in place to resist lateral rotation of the landing gear assembly 102 during taxi, takeoff, and landing of the aircraft 100.

Referring now to FIGS. 2 and 3, various features of the side brace assembly 110 are shown. The side brace assembly 110 includes an upper side brace 200 and a lower side brace 202. The upper side brace 200 includes a main body 204 having a mounting end 206 configured to be proximate to the aircraft 100 of FIG. 1 and a lower end 210 configured to be proximate to the lower side brace 202.

The side brace assembly 110 further includes an unlock actuator 212. With brief reference to FIGS. 1 and 2, the side brace assembly 110 may extend and lock in place (i.e., resist rotation of the lower side brace 202 towards the upper side brace 200) in response to extension of the landing gear assembly 102. In response to a pilot issuing a request to retract the landing gear assembly 102, the unlock actuator 212 may retract a piston 216, thus forcing rotation of the lower side brace 202 towards the upper side brace 200. This rotation unlocks the side brace assembly 110, allowing the landing gear assembly 102 to retract.

Returning reference to FIGS. 2 and 3, the unlock actuator 212 may include an unlock actuator cylinder 214 and the piston 216. Unlike conventional side brace assemblies, the unlock actuator cylinder 214 may be formed integral, or monolithic, with the main body 204 of the upper side brace 200. The integral, or monolithic, nature of the unlock actuator cylinder 214 reduces overall cost of the side brace assembly 110 and increases ease of assembly of the landing gear assembly 102 of FIG. 1. Additionally and in various embodiments, the main body 204 of the upper side brace 200 may define or include fluid channels 234 extending through the main body 204 and into the unlock actuator cylinder 214. The fluid channels 234 may port hydraulic fluid into the unlock actuator cylinder 214 in order to control operation of the unlock actuator 212. Inclusion of the fluid channels 234 through the main body 204 further reduces cost and complexity of assembly of the landing gear assembly 102.

The mounting end 206 of the upper side brace 200 may include or define a mount hinge connector 218. For example, the mount hinge connector 218 may include a pair of prongs that define openings for receiving a shaft, the shaft likewise extending through an opening of the mount 208. In that regard, the mount hinge connector 218 may pivotably couple the mounting end 206 to the mount 208. The mount 208 may be coupled to an airframe structure of an aircraft.

The lower end 210 of the upper side brace 200 may include or define a lower hinge connector 220. For example, the lower hinge connector 220 may include a pair of prongs that each define an opening for receiving a shaft, the shaft likewise extending through openings of the lower side brace 202. In that regard, the lower hinge connector 220 may pivotably couple the lower end 210 to the lower side brace 202. The lower side brace 202 may be coupled to a main fitting of a landing gear assembly, such as the main fitting 104 of FIG. 1.

The upper side brace 200 may further include a lock hinge connector 224 located between the mounting end 206 and the lower end 210. The lock hinge connector 224 may include a pair of prongs that each define an opening for receiving a shaft, the shaft likewise extending through openings of at least one lock link 230. The lock links 230 may extend from the lock hinge connector 224 to the lower side brace 202. The lock links 230 may resist rotation of the lower side brace 202 towards the upper side brace 200. The lock hinge connector 224 may be used to pivotably couple the lock links 230 to the upper side brace 200.

The upper side brace 200 may further include or define spring apertures 226. The spring apertures 226 may be coupled to springs 232. The springs 232 may extend from the spring apertures 226 to the lock links 230. In that regard, the springs may cause the lock links 230 to lock the upper side brace 200 in place relative to the lower side brace 202. In that regard, the springs 232 cause the lock links 230 to resist rotation of the lower side brace 202 relative to the upper side brace 200.

The side brace assembly 110 may further include an actuator link 228. The actuator link 228 may extend from the lock links 230 to the unlock actuator 212. In response to actuation of the piston 216, the actuator link 228 may translate actuation of the piston 216 to the lock links 230, thus unlocking the lower side brace 202 from the upper side brace 200 and allowing rotation of the lower side brace 202 relative to the upper side brace 200 to allow retraction of the landing gear assembly 102 of FIG. 1.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An upper side brace for use in landing gear, the upper side brace comprising:
   a main body having a mounting end configured to be proximal to an aircraft and a lower end configured to be proximal to a lower side brace; and
   an unlock actuator cylinder formed monolithic with the main body and configured to house a piston to form an unlock actuator, wherein:
      the main body defines fluid channels in fluidic communication with the unlock actuator cylinder and configured to port fluid at least one of to or from the unlock actuator cylinder, and
      the main body further defines a lock hinge connector located between the mounting end and the lower end and configured to be pivotably coupled to an actuator link such that the actuator link is located between the lock hinge connector and the piston.

2. The upper side brace of claim 1, wherein the mounting end of the main body defines a mount hinge connector configured to pivotably couple to a mount.

3. The upper side brace of claim 2, wherein the lower end of the main body defines a lower hinge connector configured to pivotably couple to the lower side brace.

4. The upper side brace of claim 1, wherein the main body further defines a spring aperture configured to be coupled to a spring.

5. The upper side brace of claim 1 wherein the unlock actuator cylinder defines a tube configured to receive the piston of the unlock actuator.

6. A side brace assembly for use in landing gear, the side brace assembly comprising:
   an actuator link;
   a lower side brace; and
   an upper side brace having a main body with a mounting end configured to be proximal to an aircraft and a lower end configured to be coupled to the lower side brace, and an unlock actuator cylinder formed monolithic with the main body and configured to house a piston to form an unlock actuator, wherein:
      the main body of the upper side brace defines fluid channels in fluidic communication with the unlock actuator cylinder and configured to port fluid at least one of to or from the unlock actuator cylinder, and
      the main body further defines a lock hinge connector located between the mounting end and the lower end and configured to be pivotably coupled to the actuator link such that the actuator link is located between the lock hinge connector and the piston.

7. The side brace assembly of claim 6, further comprising a mount, wherein the mounting end of the main body defines a mount hinge connector configured to be pivotably coupled to the mount.

8. The side brace assembly of claim 7, wherein the lower end of the main body defines a lower hinge connector configured to be pivotably coupled to the lower side brace.

9. The side brace assembly of claim 8, further comprising the piston configured to be received by the unlock actuator cylinder.

10. The side brace assembly of claim 7, further comprising lock links extending from the lock hinge connector to the lower side brace.

11. The side brace assembly of claim 7, further comprising at least one spring, wherein the main body further comprises a spring aperture configured to be coupled to the at least one spring.

12. A landing gear assembly, comprising:
   a main fitting configured to support the landing gear assembly;
   a retraction actuator configured to retract the landing gear assembly; and
   a side brace assembly having:
      an actuator link;
      a lower side brace, and
      an upper side brace having a main body with a mounting end configured to be proximal to an aircraft and a lower end configured to be coupled to the lower side brace, and an unlock actuator cylinder formed monolithic with the main body and configured to house a piston to form an unlock actuator, wherein:
         the main body defines fluid channels in fluidic communication with the unlock actuator cylinder and configured to port fluid at least one of to or from the unlock actuator cylinder, and the main body further defines a lock hinge connector located between the mounting end and the lower end and configured to be pivotably coupled to the actuator link such that the actuator link is located between the lock hinge connector and the piston.

13. The landing gear assembly of claim 12, further comprising a mount, wherein the mounting end of the main body defines a mount hinge connector configured to be pivotably coupled to the mount.

14. The landing gear assembly of claim 13, wherein the lower end of the main body defines a lower hinge connector configured to be pivotably coupled to the lower side brace.

15. The landing gear assembly of claim 14, further comprising the piston configured to be received by the unlock actuator cylinder.

16. The landing gear assembly of claim 12, further comprising lock links extending from the lock hinge connector to the lower side brace.

17. The landing gear assembly of claim 16, further comprising at least one spring, wherein the main body further comprises a spring aperture configured to be coupled to the at least one spring.

\* \* \* \* \*